United States Patent [19]

Nakayama

[11] Patent Number: 5,280,628
[45] Date of Patent: Jan. 18, 1994

[54] INTERRUPTION CONTROLLING SYSTEM USING TIMER CIRCUITS

[75] Inventor: Makoto Nakayama, Kawasaki, Japan

[73] Assignee: Nitsuko Corporation, Kawasaki, Japan

[21] Appl. No.: 820,572

[22] Filed: Jan. 14, 1992

[51] Int. Cl.[5] .................. G06F 13/372; G06F 13/376
[52] U.S. Cl. .................................. 395/725; 395/550; 364/242
[58] Field of Search .............. 395/550, 725, 275, 200; 364/242, 230.2

[56] References Cited

U.S. PATENT DOCUMENTS

| | | | |
|---|---|---|---|
| 4,090,239 | 5/1978 | Twibell et al. | 395/550 |
| 4,159,516 | 6/1979 | Henrion et al. | 395/275 |
| 4,792,890 | 12/1988 | Blair et al. | 395/725 |
| 5,168,568 | 12/1992 | Thayer et al. | 395/725 |
| 5,193,193 | 3/1993 | Iyer | 395/725 |

FOREIGN PATENT DOCUMENTS

| | | |
|---|---|---|
| 1217355 | 12/1970 | United Kingdom |
| 1437985 | 6/1976 | United Kingdom |
| 2076190 | 11/1981 | United Kingdom |

Primary Examiner—Dale M. Shaw
Assistant Examiner—D. Dinh
Attorney, Agent, or Firm—Frishauf, Holtz, Goodman & Woodward

[57] ABSTRACT

For controlling an original interruption request produced in each of peripheral units (12-1 to 12-N), the peripheral units are connected to an interruption control line (20) in common. When the original interruption request is produced, the peripheral unit in question continuously supplies an interruption control signal to the interruption control line unless the interruption control line is already supplied with the interruption control signal from other peripheral units. A timer circuit (23) of the peripheral unit in question times a preselected time interval from a time instant at which the peripheral unit in question begins to supply the interruption control signal to the interruption control line. The timer circuit suspends its operation while an interruption request line (10) is supplied with an interruption request signal from other peripheral units. When the time interval is timed, the peripheral unit in question continuously supplies the interruption request signal to the interruption request line. The time intervals of the timer circuits of the peripheral units are different from each other.

2 Claims, 4 Drawing Sheets

INTERRUPTION CONTROLLING SYSTEM USING TIMER CIRCUITS

BACKGROUND OF THE INVENTION

This invention relates to an interruption controlling system for controlling a processing interruption request signal.

An interruption controlling system of the type described, generally comprises an interruption request signal line, a main processor unit connected to the interruption request signal line, and first through N-th peripheral units, each connected to the interruption request signal line, where N represents an integer greater than one. The interruption controlling system is for controlling the processing interruption request signal which is produced by each of the first through the N-th peripheral units for the main processor unit to be supplied to the interruption request signal line.

The main processor unit comprises a main processor connected to the interruption request signal line for accepting, as an accepted interruption request signal, the processing interruption request signal from the interruption request signal line.

The first through the N-th peripheral units are similar in structure to each other. Each of the first through the N-th peripheral units comprises a subsidiary processor for producing an original interruption request signal.

As will later be described, each of the first through the N-th peripheral units has input and output interruption control terminals in a conventional interruption controlling system. The output interruption control terminal of the first peripheral unit is connected to the input interruption control terminal of the second peripheral unit. Likewise, the output interruption control terminal of the (N-1)-th peripheral unit is connected to the input interruption control terminal of the N-th peripheral unit.

Merely for brevity of description, it will be assumed that N is equal to four and that the subsidiary processor of a second peripheral unit succeeding the first peripheral unit produces the original interruption request signal. In this case, the second peripheral unit processes the original interruption request signal into an interruption control signal of a low level to continuously supply the interruption control signal to the output interruption control terminal of the second peripheral unit unless the input interruption control terminal of the second peripheral unit is already supplied with the interruption control signal of the low level.

While a third peripheral unit succeeding the second peripheral unit receives the interruption control signal of the low level through the input interruption control terminal of the third peripheral unit from the output interruption control terminal of the second peripheral unit, the third peripheral unit continuously supplies the interruption control signal of the low level to the output interruption control terminal of the third peripheral unit to thereby supply the interruption control signal of the low level to the input interruption control terminal of the fourth peripheral unit.

Thereafter, the second peripheral unit processes the original interruption request signal into the processing interruption request signal to continuously supply the processing interruption request signal to the interruption request signal line unless the input interruption control terminal of the second peripheral unit is already supplied with the interruption control signal of the low level.

With this structure, the first peripheral unit has a highest priority of interruption. The second peripheral unit has a highest priority of interruption except the first peripheral unit. The fourth peripheral unit has a lowest priority among the first through the fourth peripheral units. Such priorities of interruption for the peripheral units are determined by connecting relationship among the peripheral units.

Inasmuch as an interruption control signal line is necessary in connecting the output interruption control terminal of the first peripheral unit to the input interruption control terminal of the second peripheral unit independently of a different interruption control signal line which is necessary in connecting the output interruption control terminal of the second peripheral unit to the input interruption control terminal of the third peripheral unit, connection between the peripheral units by using the interruption control signal lines is inevitably complicated as the number of the peripheral units increases. From this viewpoint, it is desirable to provide an interruption controlling system wherein the priorities of interruption for the peripheral units are determined independently of the connecting relationship among the peripheral units.

SUMMARY OF THE INVENTION

It is therefore an object of this invention to provide an interruption controlling system which has a simple structure.

It is another object of this invention to provide an interruption controlling system of the type described, wherein priorities of interruption for peripheral units are determined independently of connecting relationship among the peripheral units.

It is still another object of this invention to provide an interruption controlling system of the type described, wherein the peripheral units comprise timer circuits for use in determining different priorities of interruption for the peripheral units.

Other objects of this invention will become clear as the description proceeds.

On describing the gist of this invention, it is possible to understand that an interruption controlling system includes: an interruption request signal line; a main processor unit connected to the interruption request signal line; and first through N-th peripheral units, each connected to the interruption request signal line, where N represents an integer greater than one. The interruption controlling system is for controlling a processing interruption request signal which is produced by each of the first through the N-th peripheral units for the main processor unit to be supplied to the interruption request signal line. The main processor unit comprises: a main processor connected to the interruption request signal line for accepting, as an accepted interruption request signal, the processing interruption request signal from the interruption request signal line. Each of the first through the N-th peripheral units comprises: a subsidiary processor for producing an original interruption request signal.

According to an aspect of this invention, the above-understood interruption controlling system comprises: an interruption control signal line to which each of the first through the N-th peripheral units is connected. Each of the first through the N-th peripheral units further comprises: first signal processing means connected to the interruption control signal line and the subsidiary processor for processing the original interruption request signal into an interruption control signal to continuously supply the interruption control signal to the interruption control signal line unless the interruption control signal line is already supplied with the interruption control signal from any one of the first through the N-th peripheral units; timer means connected to the interruption request signal line and the first signal processing means for carrying out, unless the interruption request signal line is supplied with the processing interruption request signal from any one of the first through the N-th peripheral units, a timer operation of timing a preselected time interval from a time instant at which the first signal processing means begins to supply the interruption control signal to the interruption control signal line, the timer means suspending the timer operation thereof while the interruption request signal line is supplied with the processing interruption request signal from any one of the first through the N-th peripheral units, the timer means thereby producing a time-out signal when the timer means times the preselected time interval; and second signal processing means connected to the interruption request signal line, the subsidiary processor, and the timer means for processing the original interruption request signal into the processing interruption request signal in response to the time-out signal to continuously supply the processing interruption request signal to the interruption request signal line. The timer means of the first through the N-th peripheral units are for carrying out the timer operations of timing the preselected time intervals which are different from each other.

According to another aspect of this invention, the above-understood interruption controlling system comprises: an interruption control signal line to which each of the first through the N-th peripheral units is connected; and a clock pulse line. The main processor unit further comprises: a clock pulse generator connected to the clock pulse line for generating a sequence of clock pulses to successively supply the clock pulses to the clock pulse line. Each of the first through the N-th peripheral units further comprises: first signal processing means connected to the interruption control signal line and the subsidiary processor for processing the original interruption request signal into an interruption control signal to continuously supply the interruption control signal to the interruption control signal line unless the interruption control signal line is already supplied with the interruption control signal from any one of the first through the N-th peripheral units; timer means connected to the interruption request signal line, the clock pulse line, and the first signal processing means for carrying out, unless the interruption request signal line is supplied with the processing interruption request signal from any one of the first through the N-th peripheral units, a timer operation of timing a preselected time interval in response to the clock pulses from a time instant at which the first signal processing means begins to supply the interruption control signal to the interruption control signal line, the timer means suspending the timer operation thereof while the interruption request signal line is supplied with the processing interruption request signal from any one of the first through the N-th peripheral units, the timer means thereby producing a time-out signal when the timer means times the preselected time interval; and second signal processing means connected to the interruption request signal line, the subsidiary processor, and the timer means for processing the original interruption request signal into the processing interruption request signal in response to the time-out signal to continuously supply the processing interruption request signal to the interruption request signal line. The timer means of the first through the N-th peripheral units are for carrying out the timer operations of timing, in response to the clock pulses, the preselected time intervals which are different from each other.

DESCRIPTION OF THE PREFERRED EMBODIMENT

Figure 1:
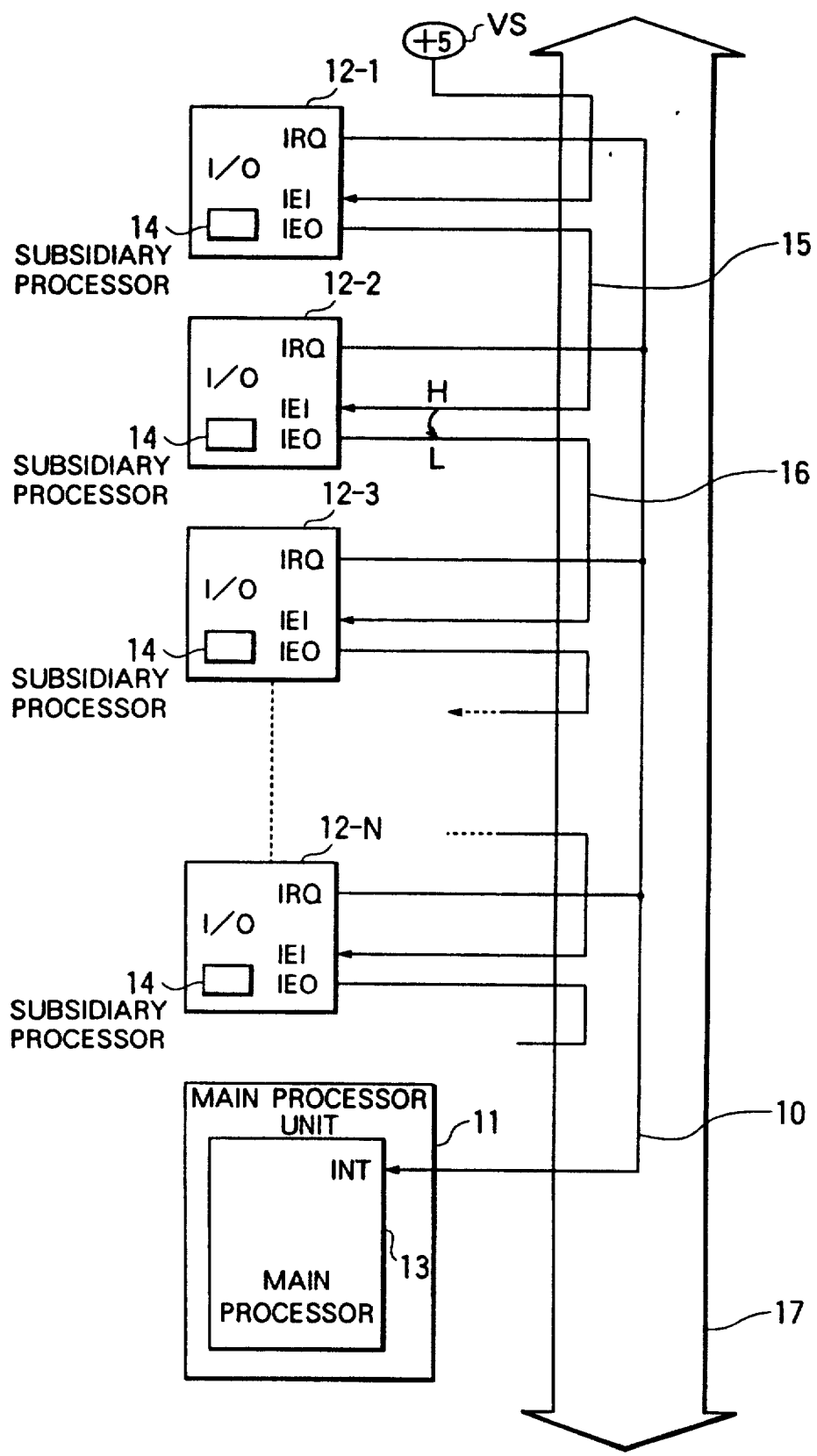
FIG. 1 is a block diagram of a conventional interruption controlling system.

Referring to FIG. 1, a conventional interruption control system will be described at first for a better understanding of this invention. The interruption controlling system is substantially equivalent to the conventional interruption controlling system described in the preamble of the instant specification. The interruption controlling system generally comprises an interruption request signal line 10, a main processor unit 11 connected to the interruption request signal line 10, and first through N-th peripheral units 12-1 to 12-N, each connected to the interruption request signal line 10, where N represents an integer greater than one. As is known in the art, each of the peripheral units 12 (suffixes omitted) may be called an input-output unit and is therefore labelled I/0. The interruption controlling system is for controlling a processing interruption request signal which is produced by each of the first through the N-th peripheral units 12 for the main processor unit 11 to be supplied to the interruption request signal line 10.

The main processor unit 11 comprises a main processor 13 having an input interruption request terminal which is labelled INT and is connected to the interruption request signal line 10. The main processor 13 accepts, as an accepted interruption request signal, the processing interruption request signal from the interruption request signal line 10.

The first through the N-th peripheral units 12 are similar to one another. Each of the first through the N-th peripheral units 12-1 to 12-N has an interruption request terminal labelled IRQ and comprises a subsidiary processor 40 for producing an original interruption request signal.

Each of the peripheral units 12 has input and output interruption control terminals labelled IEI and IEO, respectively. The input interruption control terminal IEI of the first peripheral unit 12-1 is connected to a voltage source VS of +5 volts and is supplied with a high level signal of a high level (namely, +5 volts) that is produced by the voltage source VS. The output interruption control terminal IEO of the first peripheral unit 12-1 is connected to the input interruption control terminal IEI of the second peripheral unit 12-2. Likewise, the output interruption control terminal IEO of the (N-1)-th peripheral unit (not shown) is connected to the input interruption control terminal IEI of the N-th peripheral unit 12-N.

It will be assumed that the subsidiary processor 14 of a second peripheral unit 12-2 succeeding the first peripheral unit 12-1 produces the original interruption request signal. In this case, the second peripheral unit 12-2 processes the original interruption request signal into an interruption control signal of a low level (for example, an earth voltage) to continuously supply the interruption control signal of the low level L to the output interruption control terminal IEO of the second peripheral unit 12-2 unless the input interruption control terminal IEI of the second peripheral unit 12-2 is already supplied with the interruption control signal of the low level. In other words, the second peripheral unit 12-2 continuously supplies the interruption control signal of the low level L to the output interruption control terminal IEO of the second peripheral unit 12-2 when the input interruption control terminal IEI of the second peripheral unit 12-2 is supplied with a high level signal of a high level (equal to +5 volts) H from the output interruption control terminal IEO of the first peripheral unit 12-1.

While a third peripheral unit 12-3 succeeding the second peripheral unit 12-2 receives the interruption control signal of the low level through the input interruption control terminal IEI of the third peripheral unit 12-3 from the output interruption control terminal IEO of the second peripheral unit 12-2, the third peripheral unit 12-3 continuously supplies the interruption control signal of the low level to the output interruption control terminal IEO of the third peripheral unit 12-3 to thereby supply the interruption control signal of the low level to the input interruption control terminal IEI of a fourth peripheral unit (not shown) succeeding the third peripheral unit 12-3. Likewise, the input interruption control terminal IEI of the N-th peripheral unit 12-N is supplied with the interruption control signal of the low level from the output interruption control terminal IEO of the (N-1)-th peripheral unit.

Thereafter, the second peripheral unit 12-2 processes the original interruption request signal into the processing interruption request signal to continuously supply the processing interruption request signal to the interruption request signal line 10 through the interruption request terminal IRQ of the second peripheral unit 12-2 unless the input interruption control terminal IEI of the second peripheral unit 12-2 is already supplied with the interruption control signal of the low level.

As is apparent from the above, the first peripheral unit 12-1 has a highest priority of interruption. The second peripheral unit 12-2 has a highest priority of interruption but the first peripheral unit 12-1. The N-th peripheral unit 12-N has a lowest priority of interruption. Such priorities of interruption for the peripheral units 12 are determined by connecting relationship among the peripheral units 12.

With this structure, an interruption control signal line 15 is necessary in connecting the output interruption control terminal IEO of the first peripheral unit 12-1 to the input interruption control terminal IEI of the second peripheral unit 12-2 separately from a different interruption control signal line 16 which is necessary in connecting the output interruption control terminal IEO of the second peripheral unit 12-2 to the input interruption control terminal IEI of the third peripheral unit 12-3. Likewise, similar connection is carried out for remaining peripheral units. A system bus 17 comprises the interruption request signal line 10, the interruption control signal lines 15 and 16, and other interruption control signal lines. As described in the preamble of the instant specification, such connection between the peripheral units by using the interruption control signal lines is inevitably complicated as the number of the peripheral units increases.

Figure 2:
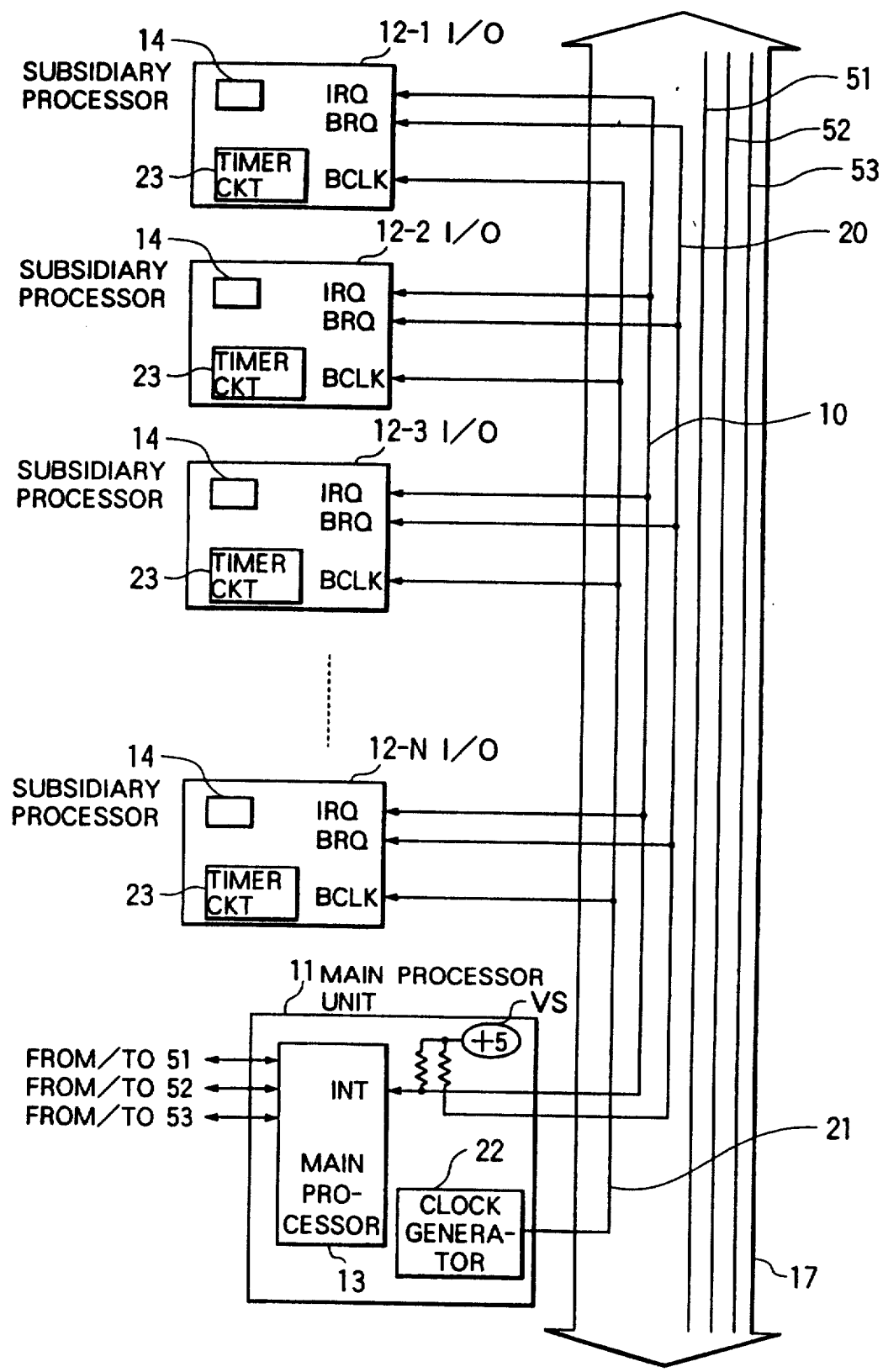
FIG. 2 is a block diagram of an interruption controlling system according to an embodiment of this invention.

Turning to FIG. 2, an interruption controlling system according to an embodiment of this invention comprises similar parts designated by like reference numerals. The interruption controlling system comprises an interruption control signal line 20 and a clock pulse line 21. Each of the peripheral units 12 (suffixes omitted) has an interruption control terminal which is labelled BRQ and is connected to the interruption control signal line 20.

The main processor unit 11 further comprises a clock generator 22 and a voltage source VS of +5 volts. The clock generator 22 is connected to the clock pulse line 21 for generating a sequence of clock pulses to successively supply the clock pulses to the clock pulse line 21. Each of the peripheral units 12 has a clock pulse terminal which is labelled BCLK and is connected to the clock pulse line 21. The voltage source VS successively supplies a high level signal of a high level (namely, +5 volts) to the interruption request signal line 10 and the interruption control signal line 20.

Figure 3:
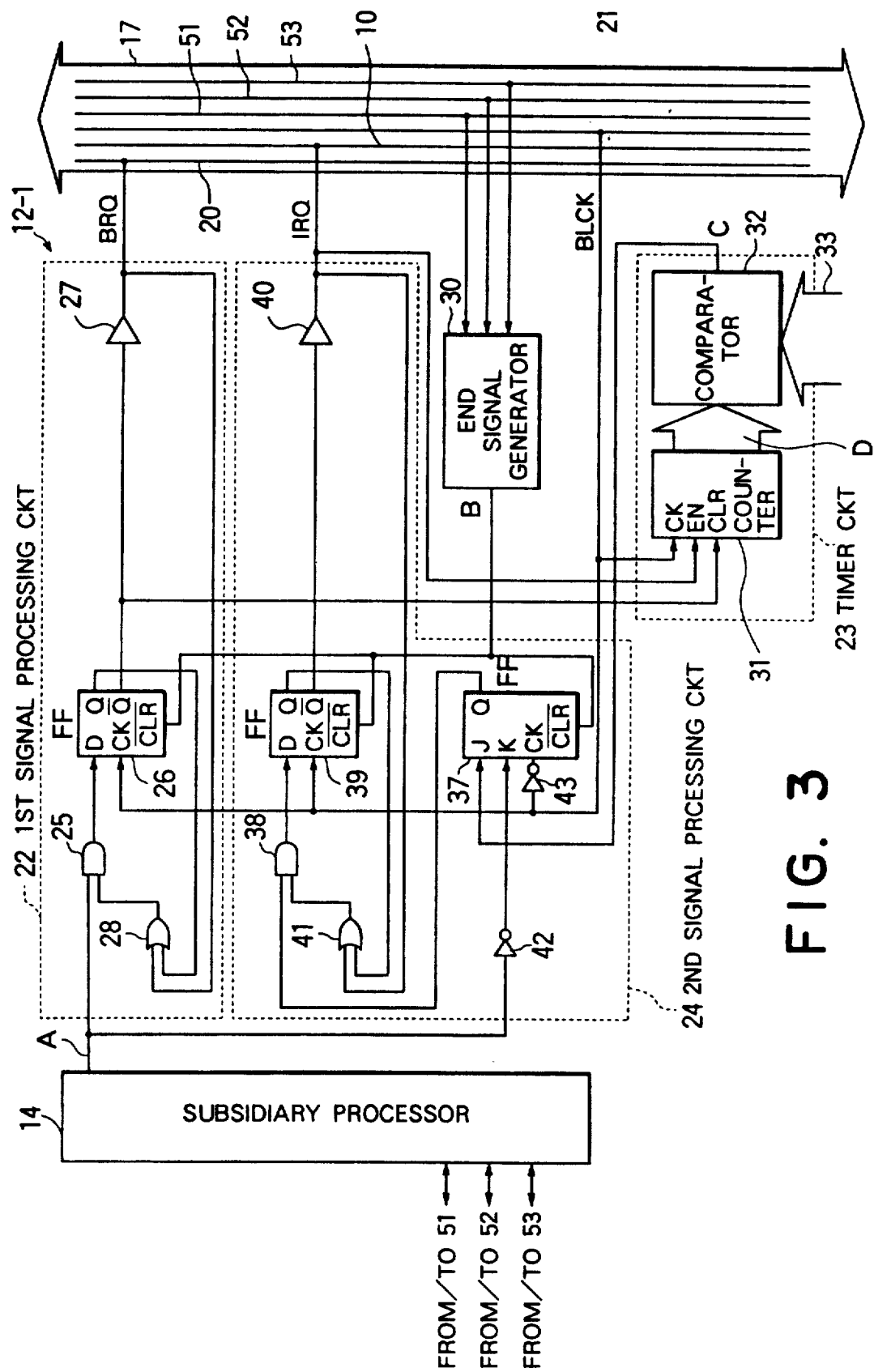
FIG. 3 is a block diagram of a peripheral unit included in the interruption controlling system illustrated in FIG. 2.

Turning to FIG. 3 with reference to FIG. 2 continued, attention will be directed to the first peripheral unit 12-1. Although description will be made only as regard the first peripheral unit 12-1, each of the second through the N-th peripheral units 12-2 to 12-N is similar in structure and in operation to the first peripheral unit 12-1.

The first peripheral unit 12-1 further comprises a first signal processing circuit 22, a timer circuit 23, and a second signal processing circuit 24.

The first signal processing circuit 22 is connected to the interruption control signal line 20 through the interruption control terminal BRQ and to the subsidiary processor 14. The first signal processing circuit 22 processes the original interruption request signal of a high level into an interruption control signal of a low level (namely, an earth voltage) to continuously supply the interruption control signal to the interruption control signal line 20 through the interruption control terminal BRQ unless the interruption control signal line 20 is already supplied with the interruption control signal from any one of the peripheral units 12 except the first peripheral unit 12-1. The original interruption request signal is indicated in FIG. 3 at a reference symbol A and is produced by the subsidiary processor 14 as mentioned above.

More specifically, the first signal processing circuit 22 comprises an AND gate 25, a D-type flip-flop (FF) 26, a noninverted buffer 27, and an OR gate 28. The AND gate 25 has first and second input terminals which are connected to the subsidiary processor 14 and an output terminal of the OR gate 28, respectively.

The flip-flop 26 has a data input terminal D, a clock pulse input terminal CK, a positive output terminal Q, an inverted output terminal $\bar{Q}$, and a clear terminal $\overline{CLR}$. The data input terminal D is connected to an output terminal of the AND gate 25. The clock pulse input terminal CK is connected to the clock pulse line 21 through the clock pulse terminal BCLK. The positive output terminal Q is connected to a first input terminal of the OR gate 28. The inverted output terminal $\overline{Q}$ is connected to an input terminal of the noninverted buffer 27. The clear terminal $\overline{CLR}$ is connected to an end signal generator 30 which will later be described.

An output terminal of the noninverted buffer 27 is connected to a second input terminal of the OR gate 28 directly and to the interruption control signal line 20 through the interruption control terminal BRQ.

In an initial state, the flip-flop 26 delivers a low level signal to the positive output terminal Q and delivers a high level signal to the inverted output terminal $\overline{Q}$. When the first signal processing circuit 22 is supplied with the original interruption request signal of the high level from the subsidiary processor 14 with the interruption control signal line 20 supplied with the high level signal of the high level (namely, with the interruption control signal line 20 unsupplied with the interruption control signal of the low level), the flip-flop 26 delivers a high level signal to the positive output terminal Q and delivers a low level signal to the inverted output terminal $\overline{Q}$. The low level signal of the inverted output terminal $\overline{Q}$ is supplied through the noninverted buffer 27 to the interruption control signal line 20 as the interruption control signal.

The timer circuit 23 is connected to the interruption request signal line 10 through the interruption request terminal IRQ and to the clock pulse line 21 through the clock pulse terminal BCLK. The timer circuit 23 is furthermore connected to the inverted output terminal $\overline{Q}$ of the flip-flop 26 of the first signal processing circuit 22. Unless the interruption request signal line 10 is supplied with the processing interruption request signal from any one of the peripheral units 12 except the first peripheral unit 12-1, the timer circuit 23 carries out a timer operation of timing a preselected time interval in response to the clock pulses from a time instant at which the first signal processing circuit 22 begins to supply the interruption control signal to the interruption control signal line 20. The timer circuit 23 suspends the timer operation thereof while the interruption request signal line 10 is supplied with the processing interruption request signal from any one of the peripheral units 12 except the first peripheral unit 12-1. The timer circuit 23 thereby produces a time-out signal C of a high level when the timer circuit 23 times the preselected time interval.

More specifically, the timer circuit 23 comprises a counter 31 and a comparator 32. The counter 31 has an enable terminal EN, a clock pulse input terminal CK, and a clear terminal CLR. The enable terminal EN is connected to the interruption request signal line 10 through the interruption request terminal IRQ. The clock pulse input terminal CK of the counter 31 is connected to the clock pulse line 21 through the clock pulse terminal BCLK. The clear terminal CLR of the counter 31 is connected to the inverted output terminal $\overline{Q}$ of the flip-flop 26 of the first signal processing circuit 22. When the clear terminal CLR of the counter 31 is supplied with the low level signal from the inverted output terminal $\overline{Q}$, the counter 31 is released from a clear state. When the enable terminal EN is supplied with the high level signal from the interruption request signal line 10 with the counter 31 released from the clear state, the counter 31 carries out a counter operation of counting up an initial count to an increased count in response to the clock pulses to produce a count signal D representative of the increased count. In this event, the counter 31 suspends the counter operation thereof while the enable terminal EN is supplied with the processing interruption request signal of the low level with the counter 31 released from the clear state.

The comparator 32 is connected to the counter 31 and is given a preselected value 33. The comparator compares with the preselected value 33 the increased count represented by the count signal D. When the count is coincident with the preselected value 33, the comparator 32 produces a coincidence signal of a high level as the time-out signal C.

The second signal processing circuit 24 is connected to the interruption request signal line 10 through the interruption request terminal IRQ and is furthermore connected to the subsidiary processor 14 and to the timer circuit 23. The second signal processing circuit 24 processes the original interruption request signal A into the processing interruption request signal of the low level (namely, an earth voltage) in response to the time-out signal to continuously supply the processing interruption request signal to the interruption request signal line 10 through the interruption request terminal IRQ.

More specifically, the second signal processing circuit 24 comprises a JK-type flip-flop 37, an AND gate 38, a D-type flip-flop 39, a noninverted buffer 40, and an OR gate 41.

Attention will be directed to the JK-type flip-flop 37. The JK-type flip-flop 37 has first and second input terminals J and K, a clock pulse input terminal CK, a positive output terminal Q, and a clear terminal $\overline{CLK}$. The first input terminal J is connected to the comparator 32. The second input terminal K is connected to the subsidiary processor 14 through an inverter 42. The clock pulse input terminal CK is connected to the clock pulse line 21 through another inverter 43 and the clock pulse terminal BCLK. The clear terminal $\overline{CLK}$ is connected to the end signal generator 30.

In an initial state, the flip-flop 37 delivers a low level signal to the positive output terminal Q. When the inverter 42 is supplied with the original interruption request signal of the high level from the subsidiary processor 14, the inverter 42 inverts the original interruption request signal into an inverted original interruption request signal of a low level. When the first input terminal J of the flip-flop 37 is supplied with the time-out signal of the high level (namely, the coincidence signal of the high level) from the comparator 32 of the timer circuit 23 with the second input terminal K of the flip-flop 37 supplied with the inverted original interruption request signal of the high level, the flip-flop 37 delivers a high level signal to the positive output terminal Q.

The AND gate 25 has first and second input terminals which are connected to the positive output terminal Q of the flip-flop 37 and an output terminal of the OR gate 41, respectively.

Attention will be directed to the D-type flip-flop 39. The flip-flop 39 has a data input terminal D, a clock pulse input terminal CK, a positive output terminal Q, an inverted output terminal $\overline{Q}$, and a clear terminal $\overline{CLR}$. The data input terminal D is connected to an output terminal of the AND gate 38. The clock pulse input terminal CK is connected to the clock pulse line 21 through the clock pulse terminal BCLK. The positive output terminal Q is connected to a first input terminal of the OR gate 41. The inverted output terminal $\overline{Q}$ is connected to an input terminal of the noninverted buffer 40.

The clear terminal $\overline{CLR}$ is connected to the end signal generator 30.

An output terminal of the noninverted buffer 40 is connected to a second input terminal of the OR gate 41 directly and to the interruption request signal line 10 through the interruption request terminal IRQ.

In an initial state, the D-type flip-flop 39 delivers a low level signal to the positive output terminal Q and delivers a high level signal to the inverted output terminal $\overline{Q}$. As described above, the JK-type flip-flop 37 delivers the high level signal to the positive output terminal Q thereof in response to the time-out signal from the timer circuit 32. When the AND gate 38 is supplied with the high level signal from the positive output terminal Q of the flip-flop 37 with the interruption request signal line 10 supplied with the high level signal of the high level (namely, with the interruption request signal line 10 unsupplied with the interruption request signal of the low level), the D-type flip-flop 39 delivers a high level signal to the positive output terminal Q thereof an delivers a low level signal to the inverted output terminal $\overline{Q}$ thereof. The low level signal of the inverted output terminal $\overline{Q}$ is supplied through the noninverted buffer 40 to the interruption request signal line 10 as the processing interruption request signal.

The timer circuits 23 of the first through the N-th peripheral units 12-1 to 12-N are for carrying out the timer operations of timing, in response to the clock pulses, the preselected time intervals which are different from each other. For this purpose, the comparators 32 of the timer circuits 23 of the first through the N-th peripheral units 12-1 to 12-N are given the preselected values 33 which are different from each other.

With this structure, priorities of interruption for the first through the N-th peripheral units 12-1 to 12-N are determined by the preselected time intervals of the timer circuits 23 of the first through the N-th peripheral units 12-1 to 12-N. In other words, the priorities of interruption for the first through the N-th peripheral units 12-1 to 12-N are determined by the preselected values 33 which are given the comparators 32 of the timer circuits 23 of the first through the N-th peripheral units 12-1 to 12-N. Supposing that the comparator 32 of the timer circuit 23 of the first peripheral unit 12-1 is given a smallest one of the preselected values 33, the first peripheral unit 12-1 has a highest priority of interruption. When the comparator 32 of the timer circuit 23 of the second peripheral unit 12-2 is given a smallest one of the preselected values 33 except the comparator 32 of the timer circuit 23 of the first peripheral unit 12-1, the second peripheral unit 12-2 has a highest priority of interruption except the first peripheral unit 12-1. Further supposing that the comparator 32 of the timer circuit 23 of the N-th peripheral unit 12-N is given a largest one of the preselected values 33, the N-th peripheral unit 12-N has a lowest priority of interruption.

The end signal generator 30 is connected to a data bus 51, an address bus 52, and a control bus 53. A combination of the data, the address, and the control buses 51, 52, and 53 is included in the system bus 17 and will be referred to as a data communication bus. Each of the subsidiary processors 14 of the first through the N-th peripheral units 12-1 to 12-N is connected to the data, the address, and the control buses (the data communication bus) 51, 52, and 53 as shown in FIG. 3. The main processor 13 is connected to the data, the address, and the control buses 51, 52, and 53 as shown in FIG. 2. The main processor 13 is for carrying out data communication through the data, the address, and the control buses 51, 52, and 53 with the subsidiary processor 14 a particular one of the first through the N-th peripheral units 12-1 to 12-N that supplies the processing interruption request signal to the interruption request signal line 10.

It will be assumed that the particular one of the first through the N-th peripheral units 12-1 to 12-N corresponds to the first peripheral unit 12-1. When the main processor 13 comes to an end for the data communication, the main processor 13 informs the first peripheral unit 12-1 of the end for the data communication through the data, the address, and the control buses 51, 52, and 53 to make the end signal generator 30 of the first peripheral unit 12-1 generate an end signal B of a low level. Responsive to the end signal B, each of the flip-flop's 26, 37, and 39 of the first peripheral unit 12-1 is cleared to be put into the initial state. When each of the flip-flop's 26, 37, and 39 of the first peripheral unit 12-1 is put into the initial state, the flip-flop's 26 and 39 delivers the high level signal to the inverted output terminal $\overline{Q}$ thereof. That is, the first and the second signal processing circuits 22 and 24 stops supply of the interruption control and the processing interruption request signals to the interruption control and the interruption request signal lines 20 and 10. When the flip-flop 26 delivers the high level signal to the inverted output terminal $\overline{Q}$ thereof, the counter 31 of the timer circuit 23 is cleared to have the initial count.

Figure 4:
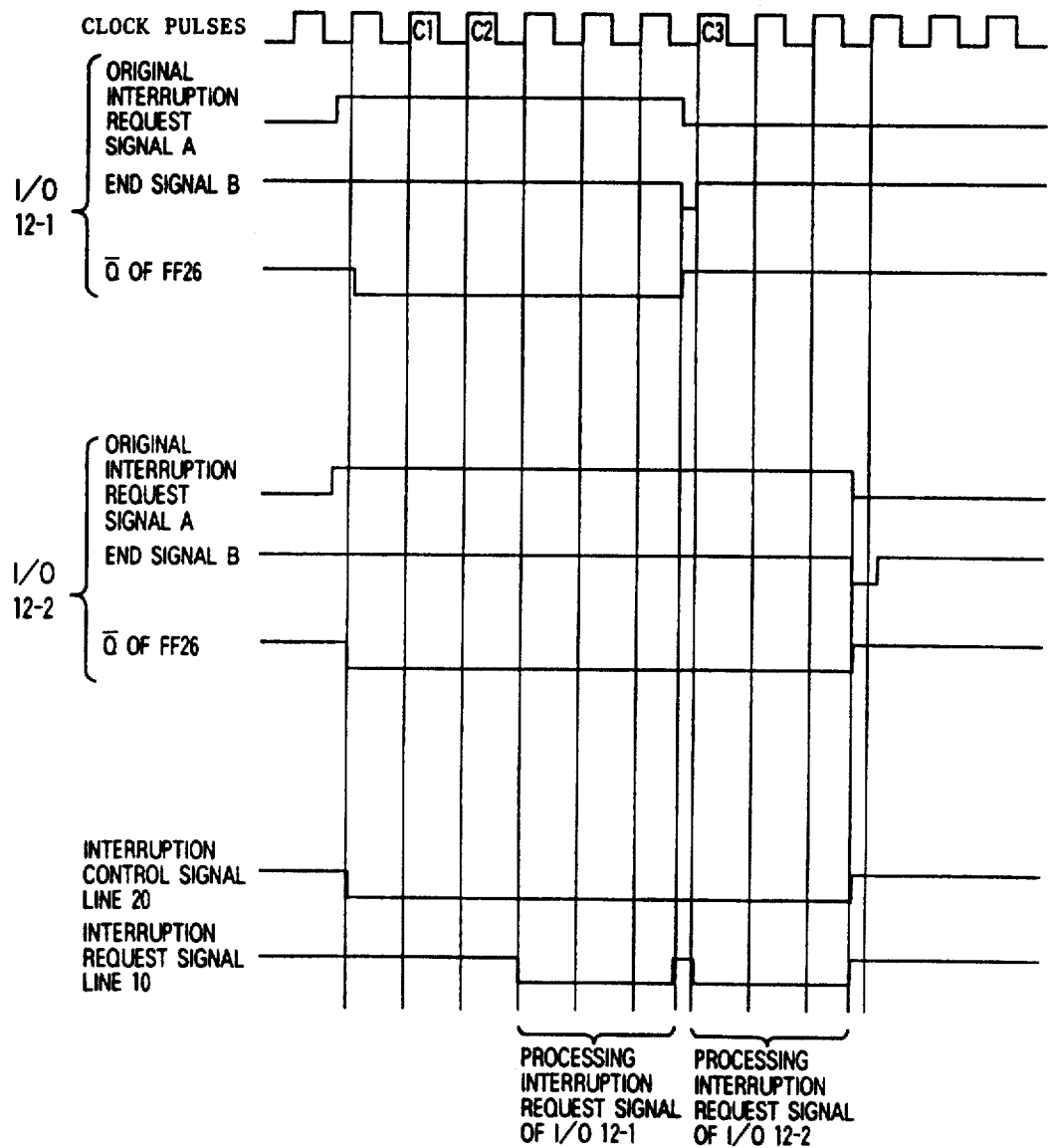
FIG. 4 is a time chart for use in describing operation of the interruption controlling system illustrated in FIG. 2.

Turning to FIG. 4 with reference to FIGS. 2 and 3 continued, description will proceed to operation of the interruption controlling system when the subsidiary processors 14 of the first and the second peripheral units 12-1 and 12-2 simultaneously produce the original interruption request signals A and, eventually, the first and the second peripheral units 12-1 and 12-2 simultaneously supply the interruption control signals of the low level to the interruption control signal line 20 from the inverted output terminals $\overline{Q}$ of the flip-flop's 26 of the first and the second peripheral units 12-1 and 12-2. It will be assumed that the comparator 32 of the timer circuit 23 of the first peripheral unit 12-1 is given the preselected value equal to two and that the comparator 32 of the timer circuit 23 of the second peripheral unit 12-2 is given the preselected value equal to three.

In this case, the comparator 32 of the first peripheral unit 12-1 produces the coincidence signal (namely, the time-out signal C) when the counter 31 of the first peripheral unit 12-1 counts up to the increased count equal to two in response to the clock pulses C1 and C2 (depicted along a top line in FIG. 4) which are supplied to the counter 31 of the first peripheral unit 12-1 immediately after the first peripheral unit 12-1 supplies the interruption control signal of the low level to the interruption control signal line 20 from the inverted output terminal $\overline{Q}$ of the flip-flop 26 of the first peripheral unit 12-1. When the coincidence signal is produced, the first peripheral unit 12-1 supplies the processing interruption request signal of the low level to the interruption request signal line 10 as depicted along a bottom line in FIG. 4.

When the counter 31 of the first peripheral unit 12-1 counts up to the increased count equal to two, the counter 31 of the second peripheral unit 12-2 also counts up to the increased count equal to two in response to the clock pulses C1 and C2 which are supplied to the counter 31 of the second peripheral unit 12-2 immediately after the second peripheral unit 12-2 supplies the interruption control signal of the low level to the interruption control signal line 20 from the inverted output terminal $\bar{Q}$ of the flip-flop 26 of the second peripheral unit 12-2. While the first peripheral unit 12-1 supplies the processing interruption request signal of the low level to the interruption request signal line 10, the counter 31 of the second peripheral unit 12-2 suspends the counter operation thereof. When the end signal generator 30 of the first peripheral unit 12-1 generates the end signal B of the low level, the first peripheral unit 12-1 stops supply of the processing interruption request signal of the low level to the interruption request signal line 10. As a result, the interruption request signal line 10 becomes to be supplied with the high level signal.

When the interruption request signal line 10 is supplied with the high level signal, the counter 31 of the second peripheral unit 12-2 restarts the counting operation of counting up the count equal to two to the increased count in response to the clock pulses. When the counter 31 of the second peripheral unit 12-2 counts up to the increased count equal to three in response to the clock pulse C3 (see the top line in FIG. 4), the comparator 32 of the second peripheral unit 12-2 produces the coincidence signal (namely, the time-out signal C). When the coincidence signal is produced, the second peripheral unit 12-2 supplies the processing interruption request signal of the low level to the interruption request signal line 10 as depicted along the bottom line in FIG. 4. The second peripheral unit 12-2 supplies the processing interruption request signal of the low level to the interruption request signal line 10 until the end signal generator 30 of the second peripheral unit 12-2 generates the end signal B.

What is claimed is:

1. An interruption controlling system including: an interruption request signal line; a main processor unit connected to said interruption request signal line; and first through N-th peripheral units, each connected to said interruption request signal line, where N represents an integer greater than one; said interruption controlling system being for controlling a processing interruption request signal which is produced by each of said first through said N-th peripheral units for said main processor unit to be supplied to said interruption request signal line;

said main processor unit comprising:

a main processor connected to said interruption request signal line for accepting, as an accepted interruption request signal, said processing interruption request signal from said interruption request signal line;

each of said first through said N-th peripheral units comprising:

a subsidiary processor for producing an original interruption request signal;

wherein:

said interruption controlling system comprises:

an interruption control signal line to which each of said first through said N-th peripheral units is connected;

each of said first through said N-th peripheral units further comprising:

first signal processing means connected to said interruption control signal line and said subsidiary processor for processing said original interruption request signal into an interruption control signal to continuously supply said interruption control signal to said interruption control signal line unless said interruption control signal line is already supplied with the interruption control signal from any one of said first through said N-th peripheral units;

timer means connected to said interruption request signal line and said first signal processing means for carrying out, unless said interruption request signal line is supplied with the processing interruption request signal from any one of said first through said N-th peripheral units, a timer operation of timing a preselected time interval from a time instant at which said first signal processing means begins to supply said interruption control signal to said interruption control signal line, said timer means suspending the time operation thereof while said interruption request signal line is supplied with the processing interruption request signal from any one of said first through said N-th peripheral units, said timer means thereby producing a time-out signal when said timer means times said preselected time interval; and second signal processing means connected to said interruption request signal line, said subsidiary processor, and said timer means for processing said original interruption request signal into said processing interruption request signal in response to said time-out signal to continuously supply said processing interruption request signal to said interruption request signal line;

the timer means of said first through said N-th peripheral units being for carrying out the timer operations of timing the preselected time intervals which are different from each other.

2. An interruption controlling system including: an interruption request signal line; a main processor unit connected to said interruption request signal line; and first through N-th peripheral units, each connected to said interruption request signal lien, where N represents an integer greater than one; said interruption controlling system being for controlling a processing interruption request signal which is produced by each of said first through said N-th peripheral units for said main processor unit to be supplied to said interruption request signal line;

said main processor unit comprising:

a main processor connected to said interruption request signal line for accepting, as an accepted interruption request signal, said processing interruption request signal from said interruption request signal line;

each of said first through said N-th peripheral units comprising:

a subsidiary processor for producing an original interruption request signal;

wherein:

said interruption controlling system comprises:

an interruption control signal line to which each of said first through said N-th peripheral units is connected; and a clock pulse line;

said main processor unit further comprising:

a clock pulse generator connected to said clock pulse line for generating a sequence of clock pulses to successively supply said clock pulses to said clock pulse line;

each of said first through said N-th peripheral units further comprising:

first signal processing means connected to said interruption control signal line and said subsidiary processor for processing said original interruption request signal into an interruption control signal to continuously supply said interruption control signal to said interruption control signal line unless said interruption control signal line is already supplied with the interruption control signal from any one of said first through said N-th peripheral units;

timer means connected to said interruption request signal line, said clock pulse line, and said first signal processing means for carrying out, unless said interruption request signal line is supplied with the processing interruption request signal from any one of said first through said N-th peripheral units, a timer operation of timing a preselected time interval in response to said clock pulses from a time instant at which said first signal processing means begins to supply said interruption control signal to said interruption control signal line, said timer means suspending the timer operation thereof while said interruption request signal line is supplied with the processing interruption request signal from any one of said first through said N-th peripheral units, said timer means thereby producing a time-out signal when said timer means times said preselected time interval; and second signal processing means connected to said interruption request signal line, said subsidiary processor, and said timer means for processing said original interruption request signal into said processing interruption request signal in response to said time-out signal to continuously supply said processing interruption request signal to said interruption request signal line;

the timer means of said first through said N-th peripheral units being for carrying out the timer operations of timing, in response to said clock pulses, the preselected time intervals which are different from each other.

* * * * *